Patented Sept. 1, 1942

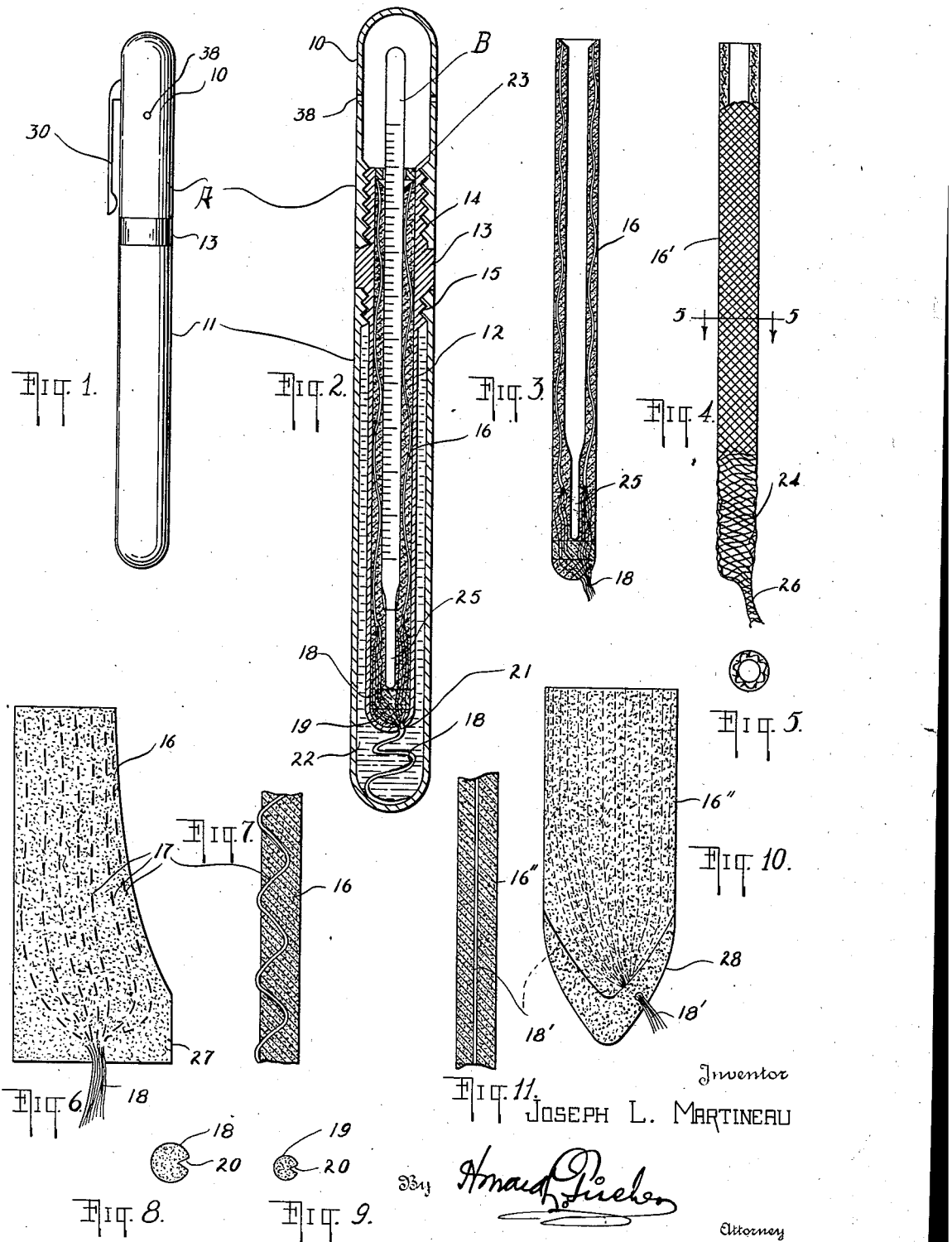

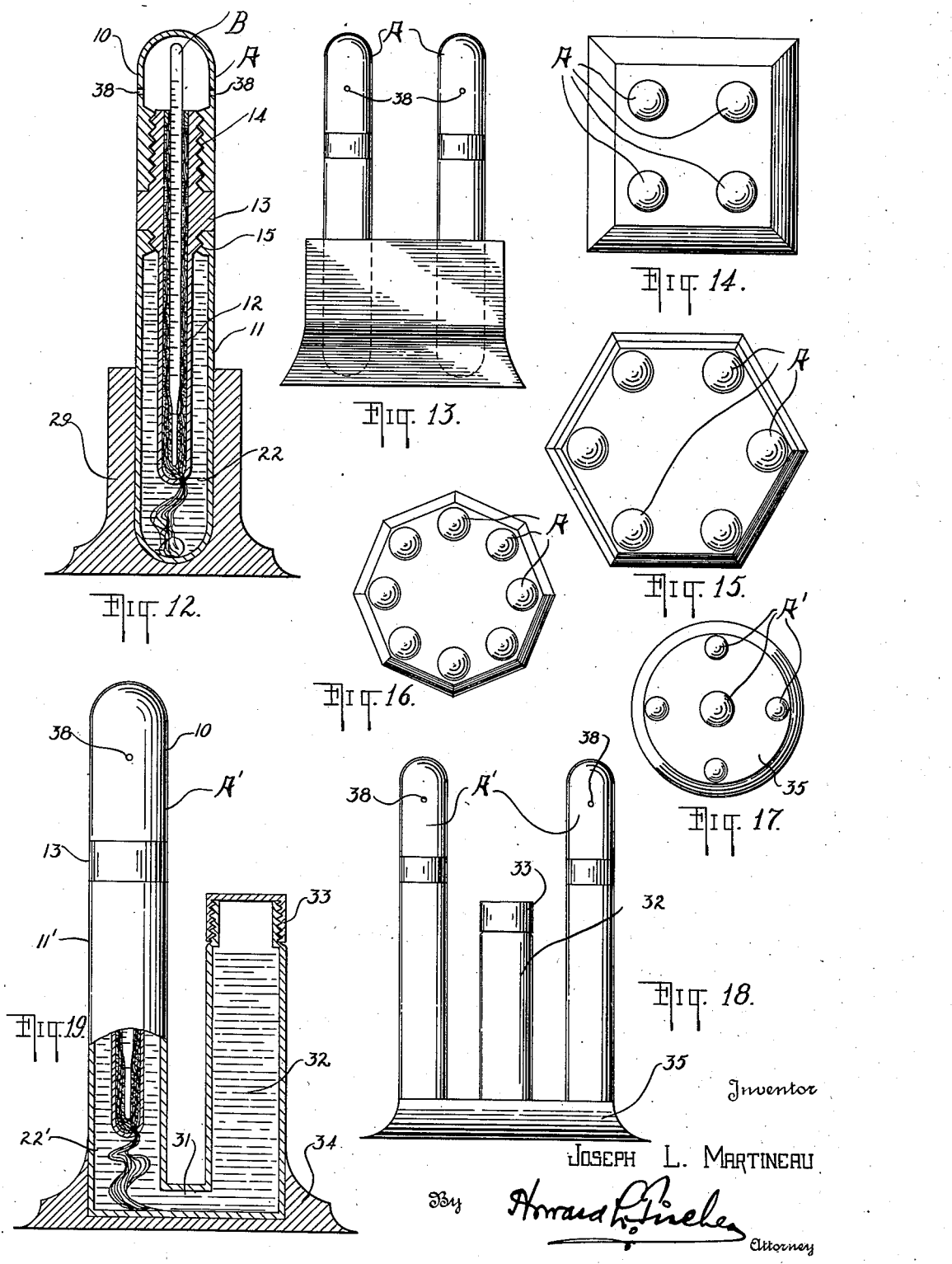

2,294,678

UNITED STATES PATENT OFFICE 2,294,678

ANTISEPTIC THERMOMETER HOLDER INSTRUMENT

Joseph L. Martineau, St. Paul, Minn.

Application August 17, 1939, Serial No. 290,664

2 Claims. (Cl. 206—16.5)

This invention relates to a clinical thermometer wherein the same is designed so that the thermometer will come in contact with an antiseptic virtually saturated lining in the thermometer chamber. The insertion of the thermometer into this chamber will sterilize the thermometer in a few minutes.

A feature of my invention resides in providing a lining for the thermometer chamber which is of an absorbent nature and which is fed by a wick either divided in individual strands or formed by the knitted material which forms the lining by being drawn out or restricted into a smaller size and passing through an opening in the base of the thermometer chamber and extending into a supply chamber which surrounds the thermometer chamber and wherein the antiseptic fluid is contained. The wick and the lining are so constructed that the wick keeps the lining sufficiently moist at all times with the antiseptic fluid, but not overly so. Thus the thermometer can be removed from its chamber without spilling or loss of the antiseptic fluid. This permits the instrument to be tilted in any direction with the thermometer out of its chamber and yet none of the antiseptic solution will run out of the same.

The reservoir chamber for the antiseptic is of a tubular nature, extending around the thermometer chamber and below the same so as to provide a reservoir chamber of sufficient size to hold the necessary or desired amount of fluid antiseptic. With an instrument constructed in this manner I provide a convenient receptacle for receiving the clinical thermometer so that it can be carried in the pocket in a comparatively small barrel, just as thermometers are now carried, excepting that my holder for the thermometer has the advantage of the antiseptic chamber lining for the thermometer which constantly is in contact with the thermometer when it is in the case, and thus is made antiseptic within a short time after it is inserted into the case and is kept in this antiseptic condition while in the holder, ready for use at any time.

A feature resides in providing a simple holder for the clinical thermometer wherein the thermometer chamber is of a tubular nature and is provided with an engaging collar on either side of which are formed threads. The threads below the collar on the thermometer tube are for supporting the reservoir chamber for the antiseptic fluid or material which extends around the thermometer chamber or tube, whereas, the threads above the collar provide the engaging means for supporting the cap on the top of the instrument.

The collar formed on the thermometer tube acts as a means for engaging the instrument when the cap is removed and also acts as a shoulder to seal the reservoir chamber as well as providing a shoulder for sealing the cap over the top of the thermometer. The absorbent lining for the thermometer tube or chamber may be of any suitable material and the wicking may extend or be sewed through the same in strands, or the wick can constitute the lining itself when of a knitted form and being of a nature which can be stretched down to a smaller diameter so that the same can pass through a restricted opening in the lower portion of the thermometer tube or chamber and into the reservoir chamber for the antiseptic material.

The thermometer chamber may be provided with a washer collar at the open end of the same into which the thermometer extends which may also provide a means of holding the lining at the upper end of the thermometer chamber. The lining may be attached to this washer in any suitable manner. The washer also restricts the opening into the thermometer chamber and thus reduces evaporation of the antiseptic solution within the same. The upper end of the thermometer is adapted to project above the antiseptic chamber so that it may be readily engaged to remove it from the same.

A primary feature resides in providing a clinical thermometer holder of a simple design, wherein the reservoir chamber extends around the thermometer chamber and below the same.

The pocket form of my clinical thermometer holder is preferably of a tubular formation wherein the outer diameter with a round, oblong, or with any formation is of the same contour from end to end to provide a smooth, comparatively small instrument which may be readily carried in the pocket. In the other forms of my clinical thermometer holder a base may be provided for one or more thermometer holder tubes, as will be more fully hereinafter set forth.

In the drawings forming a part of this specification:

Figure 1 illustrates my pocket form of my antiseptic clinical thermometer holder, showing the outside thereof.

Figure 2 is an enlarged sectional detail of the same.

Figure 3 is an enlarged sectional detail of the absorbent lining for the thermometer chamber which is molded or pressed into the desired shape.

Figure 4 illustrates an absorbent knitted or woven lining for the thermometer chamber.

Figure 5 is a section on the line 5—5 of Figure 4.

Figure 6 is a diagrammatic view of the absorbent lining laid out in flat formation.

Figure 7 is an enlarged sectional detail of the absorbent lining shown in Figure 6.

Figure 8 illustrates the absorbent pad washer which is positioned at the bottom of the thermometer chamber.

Figure 9 is a similar absorbent pad washer to that shown in Figure 8, of a smaller form for the extreme lower end of the thermometer chamber.

Figure 10 is a diagrammatic illustration of an absorbent lining in died-out flat formation, wherein the individual wick threads lie entirely within the lining and the pad for the bottom is in V formation at the bottom end.

Figure 11 is an enlarged section of the absorbent lining shown in Figure 10.

Figure 12 illustrates a desk model of my antiseptic thermometer holder, wherein a single thermometer holder tube is provided.

Figure 13 illustrates another form of desk model of my thermometer holder, wherein a number of thermometer tubes are provided.

Figure 14 is a plan view of Figure 13, showing the square type of desk instrument.

Figure 15 illustrates a plan view of a hexagonal base, holding six thermometer tubes in the same.

Figure 16 illustrates a plan view of an octagonal base adapted to support eight thermometer tubes in the same.

Figure 17 illustrates a plan view of a circular base wherein four thermometer tubes are provided, with a center reservoir chamber for the same.

Figure 18 is a side elevation of the thermometer holder instrument illustrated in Figure 17.

Figure 19 is a side elevation, partly in section, of a single thermometer holder tube with a large reservoir for antiseptic to one side of the same and connected as a fount to the reservoir chamber around the thermometer holder tube.

My antiseptic thermometer holder may be made in the pocket form A which is provided with a cap 10 to cover the top of the clinical thermometer B. The holder A is provided with a lower portion 11, and the portions 10 and 11 are of the same uniform diameter or cross section so as to provide the holder A of a smooth even contour from end to end. The antiseptic thermometer holder A in its pocket form as illustrated in Figures 1 and 2, is formed with an inner thermometer receiving tube 12 which is provided with a collar 13 interposed between the cap 10 and the lower portion 11. The collar 13 may be formed integral with the tube 12 and is adapted to provide a shoulder on either side of the same which acts as a closure seat for the cap 10 and for the lower portion 11 when these portions are connected by the threads 14 and 15 which are formed on the tube 12 on either side of the collar 13.

The tube 12 provides the thermometer chamber for the clinical thermometer B and is lined by the abosrbent liner material 16 which may be moled into shape as illustrated in the enlarged sectional view in Figure 3. The body of the lining 16 is made of any absorbent material and yet a material which has sufficient wearing qualities so that the wear of the thermometer within the same will not readily disintegrate the lining 16. When the lining 16 is laid out in flat formation, it may appear similar to that shown in Figure 6, and the strands 17 of the wick 18 may be individually threaded through the body of the lining 16 as illustrated in Figures 6 and 7. At the bottom of the lining 16 I provide a pair of washers 18 and 19, these washers forming a cushion against which the lower end of the thermometer B is adapted to rest. I have illustrated the washer 18 in Figure 8 in a plan view, and the washer 19 in Figure 9 in a plan view. These washers are cut with notches 20 in the side of the same so that the wick 18 may pass through the same.

The tube 12 is formed with opening 21 in or near the bottom of the same through which the wick 18 is adapted to extend and in which said wick fits sufficiently snug so that antiseptic contained in the reservoir chamber 22 formed about the tube 12 by the outer casing portion 11, will be drawn by the wick to the liner 16 by capillary attraction and will not pass too freely to and through the lining 16. The tube 11 may be disengaged from the shoulder of the collar 13 so as to remove the tube 11 from around the tube 12 and then the tube 11 may be filled with the desired amount of liquid antiseptic of any nature and which will act effectively to rapidly destroy any germ life which may be collected on the clinical thermometer B. When the holder A is together as illustrated in Figures 1 and 2, the clinical thermometer B is virtually surrounded by the lining 16, which is saturated with the antiseptic so as to wipe over the surface of the thermometer B when it is inserted or withdrawn from the antiseptic chamber formed by the lining 16.

A washer 23 with a central hole for receiving the thermometer B, is placed in the top of the tube 12 which is adapted to close the same excepting for the opening for the thermometer B and thus reduces evaporation of the antiseptic from the lining 16. The washer 23 also acts to hold the upper end of the lining 16. The lining 16 may be attached in any suitable manner to the washer 23, and thus the upper end of the lining 16 is maintained in its position in the tube 12.

The absorbent liner may be made in the form 16′, of a woven character, as illustrated in Figure 4, and in the section Figure 5, being formed of strands of material which are readily absorbent and which being woven may fill the chamber in the tube 12 around the thermometer B. When the liner, such as 16′ is used, it may be squeezed together or wrinkled at 24 so as to fill in around the lower bulb end 25 of the thermometer B, and from the lower portion the liner 16′ may be stretched to a small wick-like size at 26, so as to go through the opening 21 in the tube 12 and pass as a wick into the reservoir chamber 22 to extend into the antispetic fluid contained therein. The wick 16′ provides a very simple and effective moisture absorbent liner, and owing to its simple nature makes an economical means of providing a liner for the tube 12.

In the liner 16 it is necessary to increase the lower portion 27 of the same so as to provide a thicker structure when the lining 16 is rolled into tubular form at the bottom so as to fit snugly around the bulb 25 of the thermometer.

The liner may be made in the form 16″, as illustrated in Figures 10 and 11. In this form a suitable felting adapted to form a thicker construction at the bottom is provided by the V-shaped felting material 28 attached to the bottom of the body of the liner 16″. In the liner 16″ the wick 18′ may extend into the body of the same, being embedded therein in a manner to provide the wick means for feeding the moist antiseptic from the chamber 22 to the lining 16", and thus keep the same moist with antiseptic at all times.

My holder A may be inserted into a base 29 to provide a desk form instead of a pocket form of the same, in which case it is not necessary to use a pocket clip 30. The holder A when used with a base 29 of any form, is virtually identical to that heretofore described and shown in Figures 1 and 2, with the desired lining 16, 16' or 16" within the same.

In Figures 13, 14, 15 and 16, I show different forms of bases that may be used to support the holders A so that two or more holders A may be supported by a single base, each of which are self-contained within the antiseptic reservoir 22 in the base thereof, as heretofore set forth.

In Figure 19, I have shown a holder A' which is the same as the holder A, excepting the tube 11' which forms the lower end of the holder A' is not closed like the tube 11 in the pocket form, or in the forms hereinbefore set forth, but is open at the bottom to provide an antiseptic reservoir chamber 22' which connects through the opening 31 to the reservoir tube 32 which is closed by the cap 33. The base 34 supports the holder A' and the reservoir 32 in a unitary construction. In the form illustrated of the holder A', as shown in Figure 19, a single thermometer holder is provided.

The cap 10 is provided with the air vents 38 so as to provide the necessary or desired ventilation and to overcome any vacuum in disengaging the cap 10. Thus none of the moisture from the antiseptic saturated lining 16 will be drawn into the cap in the operation of the same.

The thread 15 beneath the collar 13 is preferably a left hand thread, while the thread 14 above the collar 13 is a right hand thread. By forming the threads 14 and 15 right and left hand, the cap 10 can be removed without affecting the thread 15 and thus the lower portion 11 will not be disturbed when the cap 10 is removed.

In Figures 17 and 18, I have illustrated the holder A' with a center reservoir 32 for the antiseptic fluid, supported by the circular base 35, and four of the holders A' positioned about the reservoir 32.

In accordance with the patent statutes I have described and illustrated a form of my antiseptic thermometer holder and instrument, and while a particular structure and formation is illustrated, I desire to have it understood that the same is only suggestive of a means of carrying out the principles of my invention, and the same should be interpreted within the scope of the following claims, and any variation thereof within the scope of the disclosure hereinbefore set forth, without departing from the spirit of this invention.

I claim:

1. A thermometer case comprising a liquid impervious inner case having an absorbent liner therein and provided at the upper end thereof with an enlarged portion having spaced upper and lower threaded sections, a liquid impervious outer case threadedly engaging the lower threaded section in liquid sealing contact and encircling said inner case to provide a fluid reservoir between said inner and outer cases, a washer member at the upper open end of said inner case for restricting the opening at that portion of the case, said inner case having a small passage therethrough at the lower end thereof in communication with said reservoir, a wick in said passage leading from said liner to said reservoir, and a closure cap for said case threadedly engaging a portion of said enlarged portion for effectively maintaining said cap on said case.

2. A thermometer case comprising a liquid impervious inner case having an absorbent liner extending throughout the length thereof and adapted to be in close contact with a thermometer housed therein, said inner case being provided at the upper end thereof with an enlarged portion having spaced upper and lower threaded sections, a liquid impervious outer case threadedly engaging the lower threaded section in liquid sealing contact and encircling said inner case to provide a fluid reservoir between said inner and outer cases, a washer member at the upper open end of said inner case for restricting the opening at that portion of the case, said inner case having a small passage therethrough at the lower end thereof in communication with said reservoir, a wick in said passage leading from said liner to said reservoir, and a closure cap for said case threadedly engaging the upper section of said enlarged portion for effectively maintaining said cap on said case.

JOSEPH L. MARTINEAU.